United States Patent [19]

Weder

[11] Patent Number: 5,411,167
[45] Date of Patent: May 2, 1995

[54] BASKET LINING MATERIAL HAVING AN ADHESIVE OR COHESIVE THEREON AND METHOD

[75] Inventor: Donald E. Weder, Highland, Ill.

[73] Assignee: Highland Supply Corporation, Highland, Ill.

[21] Appl. No.: 121,967

[22] Filed: Sep. 14, 1993

Related U.S. Application Data

[63] Continuation of Ser. No. 781,040, Oct. 21, 1991, abandoned, which is a continuation-in-part of Ser. No. 649,379, Jan. 31, 1991, Pat. No. 5,111,638, and a continuation-in-part of Ser. No. 502,358, Mar. 29, 1990, abandoned.

[51] Int. Cl.$^6$ .............................................. B65D 5/00
[52] U.S. Cl. ................................... 220/460; 220/401; 220/485
[58] Field of Search ............... 220/460, 470, 485, 401, 220/403, 465

[56] References Cited

U.S. PATENT DOCUMENTS

| | | |
|---|---|---|
| 557,526 | 3/1896 | Egge . |
| 732,889 | 7/1903 | Paver . |
| 920,313 | 5/1909 | Franklin .................... 220/401 X |
| 1,102,499 | 7/1914 | Haist ........................ 220/485 X |
| 1,525,015 | 2/1925 | Weeks . |
| 1,863,216 | 6/1932 | Wordingham . |
| 1,978,631 | 10/1934 | Herrlinger . |
| 2,048,123 | 7/1936 | Howard ........................ 229/87 |
| 2,170,147 | 8/1939 | Lane ........................... 206/56 |
| 2,239,398 | 4/1941 | Palmer ...................... 220/460 X |
| 2,260,230 | 10/1941 | Olson ....................... 220/485 X |
| 2,278,673 | 4/1942 | Savada et al. ................. 154/43 |
| 2,371,985 | 3/1945 | Freiberg ....................... 206/46 |
| 2,411,328 | 11/1946 | MacNab ........................ 33/12 |

(List continued on next page.)

FOREIGN PATENT DOCUMENTS 2610604  8/1988  France .

OTHER PUBLICATIONS

Exhibit A–Speed Sheet ® Brochure–Speed Sheets ® and Speed Rolls, ©1990.

Exhibit B–Speed Cover ® Brochure–The Simple Solution For Those Peak Periods, ©1989.

Exhibit A is a fan-folded "Post-It®" Note Pad, for pop-up note dispensers, R-330, 1 Pad (300 Sheets) 3" by 3" (76.2 mm × 76.2 mm) Manufactured by 3M Commercial Office Supply Division, St. Paul, Minn. 55144-1000.

Exhibit B is a 6549 note pad "Highland®" Brand, Self-stick Removable Notes, 1 Pad (100 Sheets Per Pad) 3" by 3" (76.2 mm × 76.2 mm) Manufactured by 3M Commercial Office Supply Division, St. Paul, Minn. 55144-1000.

*Primary Examiner*—Steven M. Pollard
*Attorney, Agent, or Firm*—Dunlap & Codding

[57] ABSTRACT

A basket lining material, comprising a basket having an upper end, a lower end, an outer surface, and an opening in the upper end forming an inner surface, the basket opening being sized and shaped for receiving items and the items being retained in the basket opening by the basket, and a sheet of material having an upper surface, a lower surface and an outer periphery, an adhesive being on the lower surface of the sheet of material, the sheet of material being disposed in the basket opening with the lower surface of the sheet of material being disposed adjacent the inner surface of the basket and the adhesive on the sheet of material adhesively contacting the inner surface of the basket for adhesively connecting the sheet of material to the inner surface of the basket. A method for disposing a sheet of basket lining material upon the inner surface of a basket.

8 Claims, 10 Drawing Sheets

U.S. PATENT DOCUMENTS

| | | | |
|---|---|---|---|
| 2,458,246 | 1/1949 | Brereton | 220/401 |
| 2,510,120 | 6/1950 | Leander | 117/112 |
| 2,529,060 | 11/1950 | Trillich | 117/68.5 |
| 2,544,075 | 3/1951 | Ernst et al. | 150/49 |
| 2,573,770 | 11/1951 | Meadow | 220/401 X |
| 2,621,142 | 12/1952 | Wetherell | 154/117 |
| 2,822,287 | 2/1958 | Avery | 117/14 |
| 2,846,060 | 8/1958 | Yount | 206/58 |
| 2,883,262 | 4/1959 | Borin | 21/56 |
| 3,022,605 | 2/1962 | Reynolds | 47/58 |
| 3,113,712 | 12/1963 | Kindseth | 229/14 |
| 3,121,647 | 2/1964 | Harris et al. | 118/202 |
| 3,130,113 | 4/1964 | Silman | 161/97 |
| 3,148,799 | 9/1964 | Meroney | 220/63 |
| 3,215,330 | 11/1965 | Thomas | 229/14 |
| 3,271,922 | 9/1966 | Wallerstein et al. | 53/3 |
| 3,508,372 | 4/1970 | Wallestein et al. | 53/3 |
| 3,514,012 | 5/1970 | Martin | 220/63 |
| 3,620,366 | 11/1971 | Parkinson et al. | 206/59 C |
| 3,681,105 | 8/1972 | Milutin et al. | 117/15 |
| 3,757,990 | 9/1973 | Buth | 220/63 R |
| 3,927,821 | 12/1975 | Dunning | 229/14 BL |
| 4,054,697 | 10/1977 | Reed et al. | 428/40 |
| 4,216,620 | 8/1980 | Weder et al. | 47/72 |
| 4,333,267 | 6/1982 | Witte | 47/84 |
| 4,379,101 | 4/1983 | Smith | 264/40.3 |
| 4,380,564 | 4/1983 | Cancio et al. | 428/167 |
| 4,413,725 | 11/1983 | Bruno et al. | 206/45.33 |
| 4,546,875 | 10/1985 | Zweber | 206/0.82 |
| 4,733,521 | 3/1988 | Weder et al. | 53/580 |
| 4,765,464 | 8/1988 | Ristvedt | 206/0.82 |

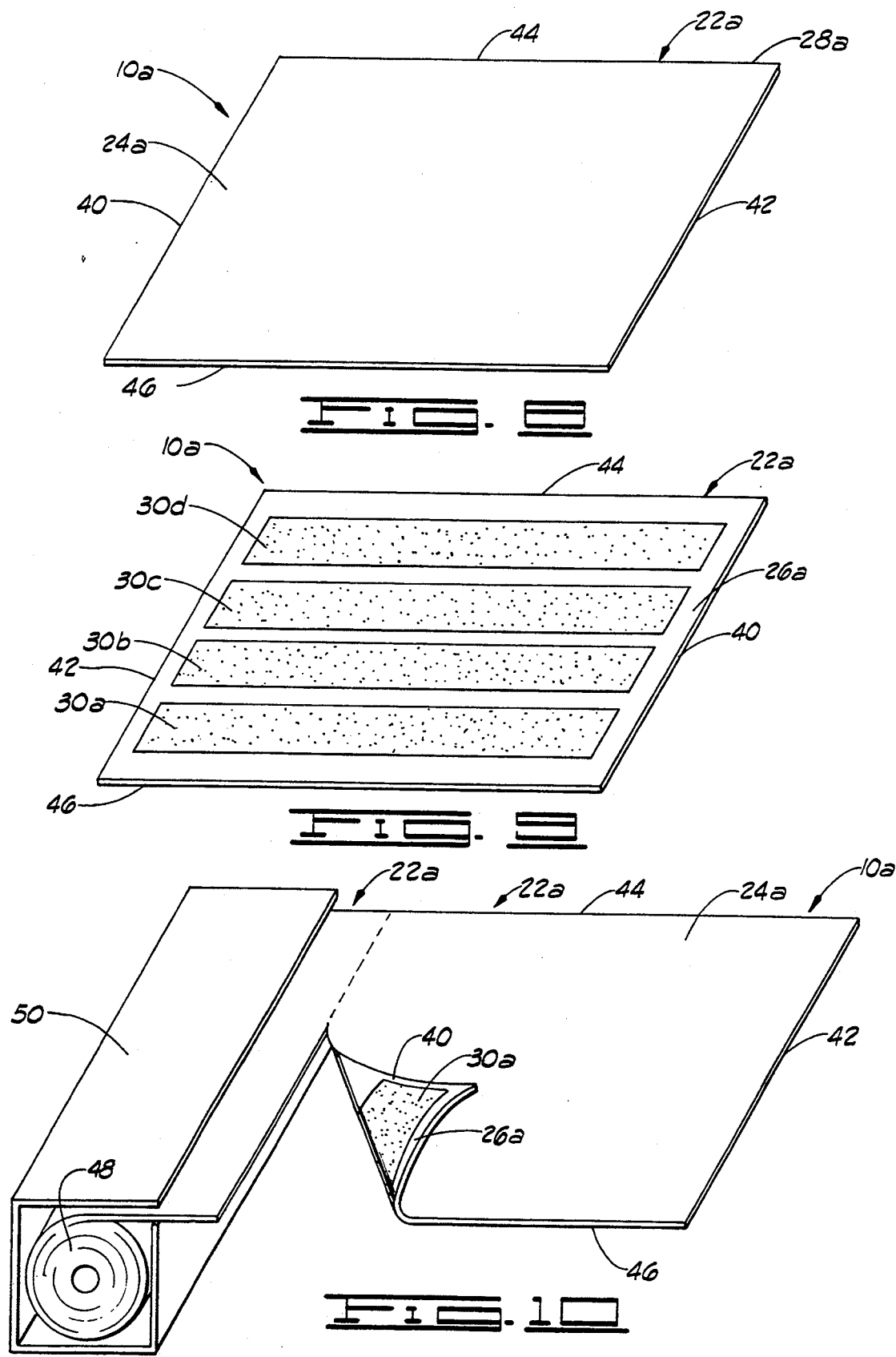

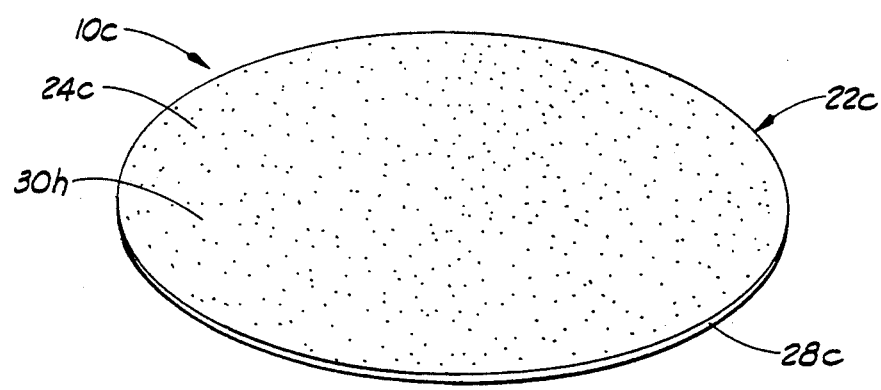
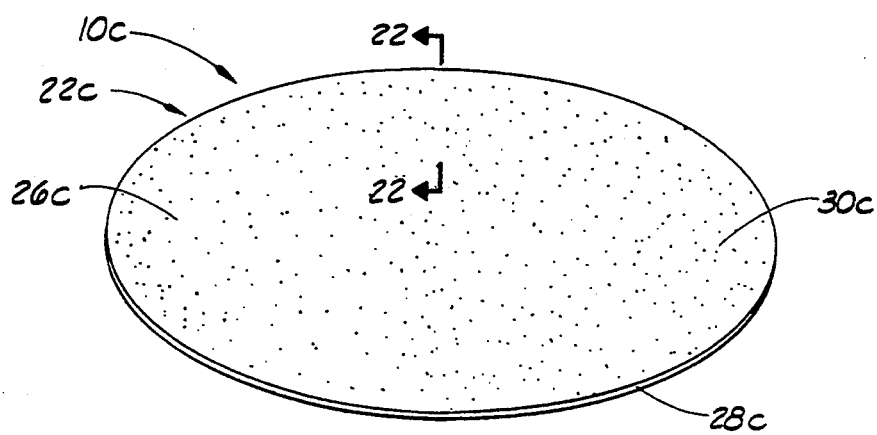
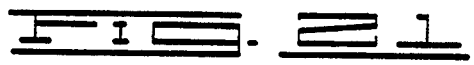
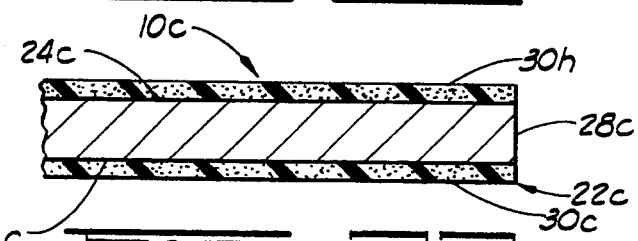
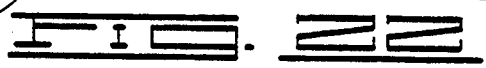
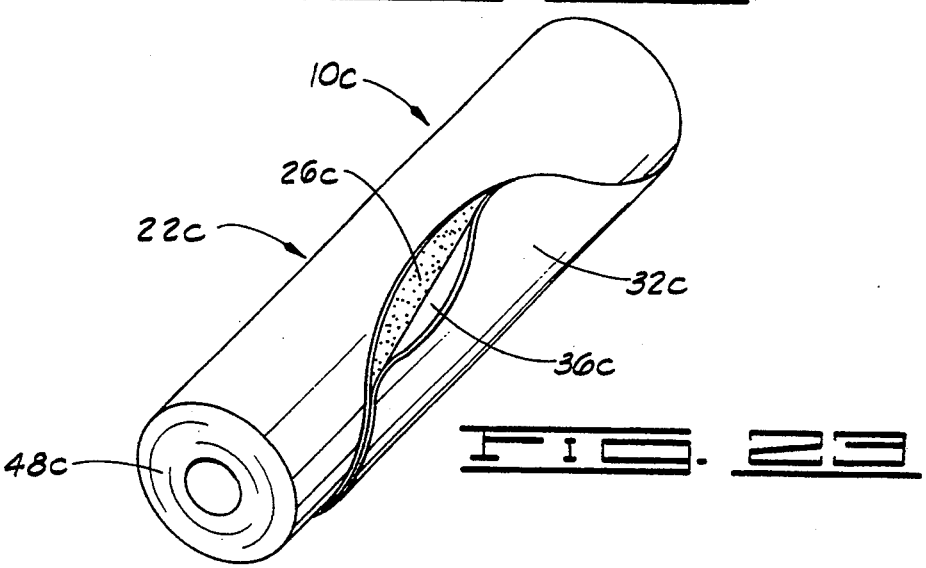
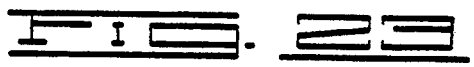

BASKET LINING MATERIAL HAVING AN ADHESIVE OR COHESIVE THEREON AND METHOD

CROSS-REFERENCE TO RELATED APPLICATIONS

This is a continuation of application U.S. Ser. No. 07/781,040 filed on Oct. 21, 1991, entitled BASKET LINING MATERIAL HAVING AN ADHESIVE OR COHESIVE THEREON AND METHOD, now abandoned, which is a continuation-in-part of U.S. Ser. No. 07/649,379, filed on Jan. 31, 1991, now U.S. Pat. No. 5,111,638, entitled, METHOD FOR WRAPPING AN OBJECT WITH A MATERIAL HAVING PRESSURE SENSITIVE ADHESIVE THEREON, and said application Ser. No. 07/781,040 is also a continuation-in-part of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO abandoned.

FIELD OF THE INVENTION

This invention generally relates to basket lining materials and, more particularly, to basket lining materials having an adhesive or cohesive thereon, and methods of using same.

BRIEF DESCRIPTION OF THE DRAWINGS

FIG. 8 is a perspective view of another modified basket lining material showing the upper surface.

FIG. 9 is a perspective view of the basket lining material of FIG. 8, but showing the lower surface.

FIG. 10 is a plurality of basket lining materials of FIGS. 8 and 9 formed in a continuous roll of material disposed in a dispenser.

FIG. 20 is a perspective view of another modified basket lining material, showing the upper surface.

FIG. 21 is a perspective view of the basket lining material of FIG. 20, but showing the lower surface.

FIG. 22 is an enlarged cross-sectional partial view of FIG. 21 taken along the lines 22—22 of FIG. 21.

FIG. 23 is the basket lining material of FIGS. 21, 22 and 23, formed in a continuous roll of material having a release sheet.

DESCRIPTION OF THE PREFERRED EMBODIMENTS

Embodiments of FIGS. 1-7

Figure 3:
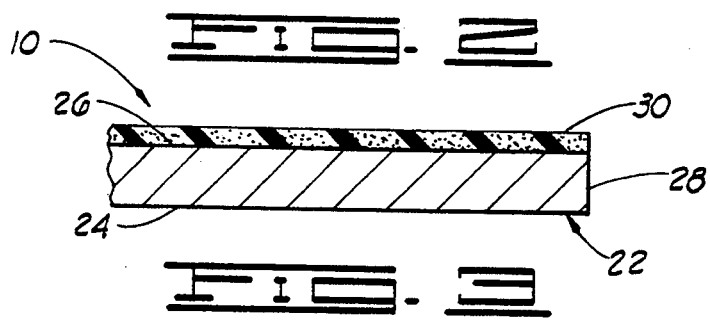
FIG. 3 is an enlarged cross-sectional partial view of FIG. 2 taken along the lines 3—3 of FIG. 2.
Figure 4:
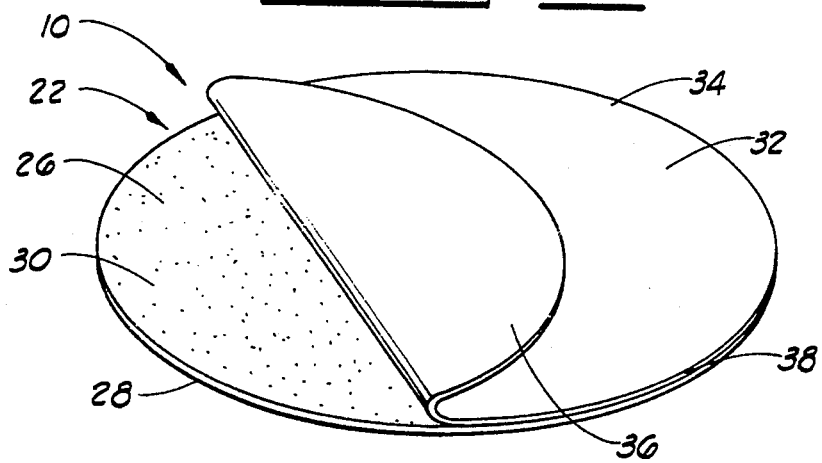
FIG. 4 is a perspective view of a modified basket lining material constructed exactly like the basket ling material of FIGS. 1, 2, and 3, but showing a release strip connected thereto.
Figure 5:
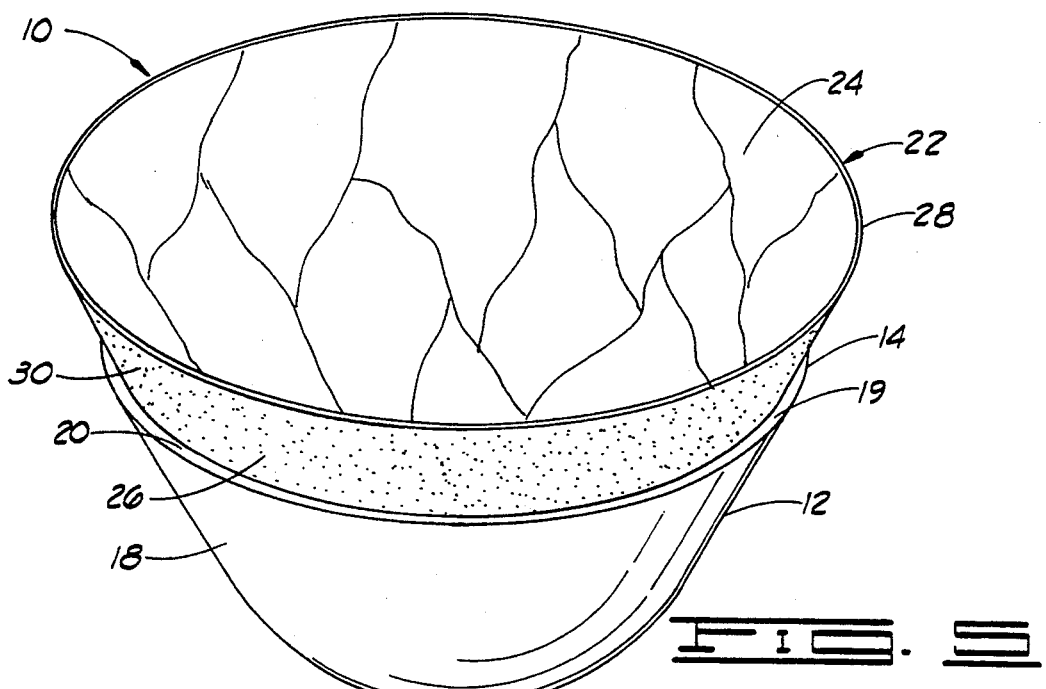
FIG. 5 is a perspective view showing the basket lining material of FIGS. 1, 2, and 3 or FIG. 4 disposed on a basket.
Figure 6:
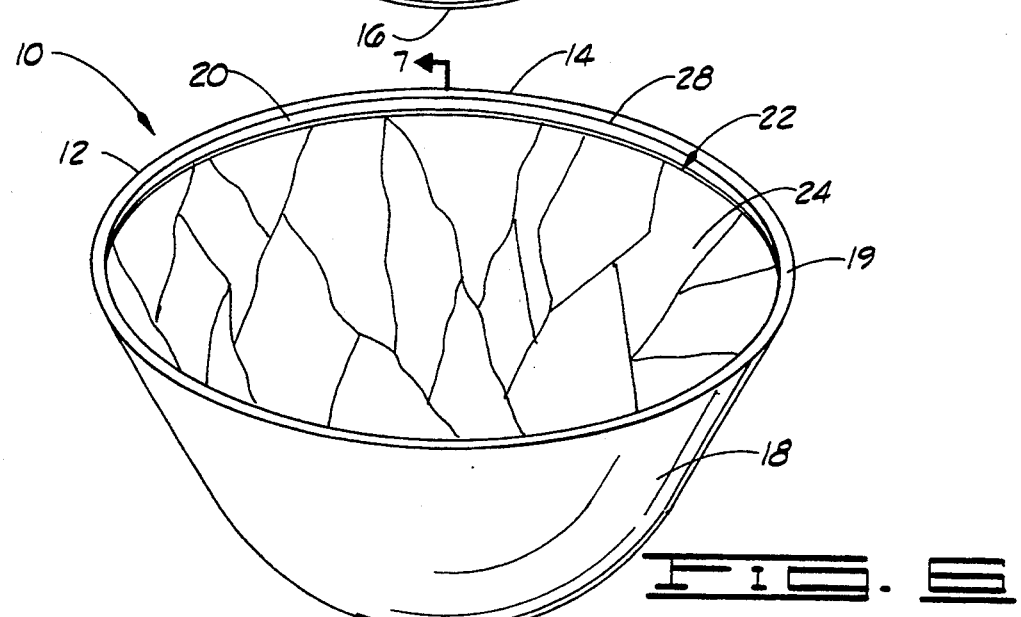
FIG. 6 is a perspective view similar to FIG. 5, but showing the basket lining material contained within the basket.
Figure 7:
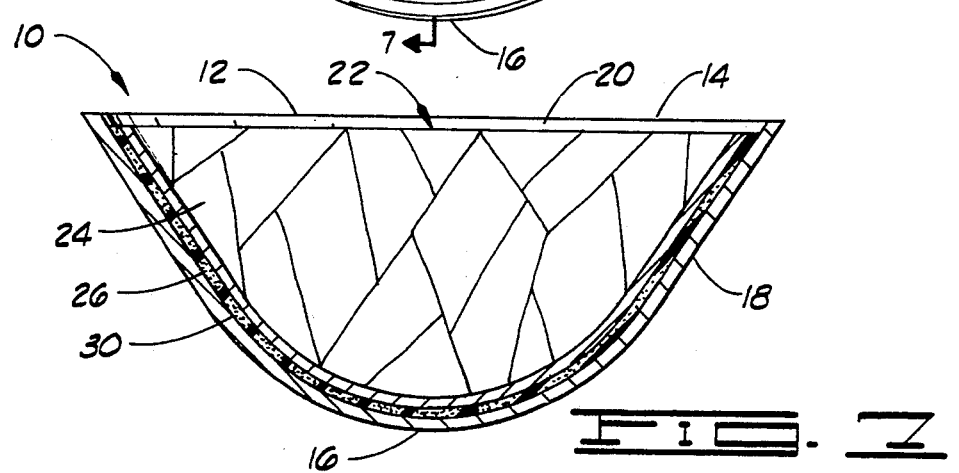
FIG. 7 is a cross-sectional partial view of FIG. 6 taken substantially along the lines 7—7 of FIG. 7.

Referring to FIGS. 1-7, designated generally by the reference numeral 10 is a basket lining material which is constructed in accordance with the present invention for lining at least a portion of a basket. The basket lining material 10 is used to line a basket. One such basket is shown in FIGS. 5-7, and is generally designated by the numeral 12.

The basket 12 has an upper end 14, a lower end 16, and an outer surface 18. An opening 19 is formed in the basket 12, with a portion of the basket opening 19 intersecting the upper end 14 of the basket 12 forming an inner surface 20. The basket opening 19 is sized and shaped for receiving items (not shown), and the items are retained in the basket opening 19 by the basket 12. Examples of baskets 12 which are used in accordance with the present invention include fruit baskets, Easter baskets, and picnic baskets.

Referring to FIGS. 1-4, the basket lining material 10 comprises a sheet of material 22. The sheet of material has an upper surface 24, a lower surface 26, and an outer periphery 28. An adhesive 30 is disposed on the lower surface 26 of the sheet of material 22. The adhesive 30 covers substantially the entire lower surface 26 of the sheet of material 22.

In the embodiment shown in FIGS. 1-7, the sheet 22 is round. It will be appreciated, however, that any shape or size of sheet 22, or combination of sheets 22, may be used to line the inner surface 20 of a basket 12 of any shape or size. For example, a round sheet 22 may be used to line a square basket 12, or vice versa. Moreover, when multiple sheets 22 are used in combination, the sheets 22 need not be uniform in size or shape. It will also be appreciated that the basket lining material 10 shown in all embodiments herein is substantially flat.

The basket lining material 10 may be made from a variety of materials. Examples of some basket lining materials used in accordance with the present invention are man-made organic polymer films, fabric (woven or nonwoven or synthetic or natural), paper, cellulose, foil, or combinations thereof.

The term "man-made organic polymer film" means a man-made resin such as a polypropylene as opposed to naturally occurring resins such as cellophane. A man-made organic polymer film is relatively strong and not as subject to tearing (substantially non-tearable), as might be the case with paper or foil. The man-made organic polymer film is a substantially linearly linked processed organic polymer film and is a synthetic liner chain organic polymer where the carbon atoms are substantially linearly linked. Such films are synthetic polymers formed or synthesized from monomers.

Each sheet of material 22 may vary in color. Further, each sheet 22 may consist of designs which are printed, etched, and/or embossed; in addition, each sheet 22 may have various colorings, coatings, flocking and/or metallic finishes, or be characterized totally or partially by pearlescent, translucent, transparent, or the like, qualities. Each of the above-named characteristics may occur alone or in combination. Moreover, each surface of the sheet 22 may vary in the combination of such characteristics.

The sheet of material 22 may be constructed of a single sheet of material or a plurality of sheets. Any thickness of the sheet of material 22 may be utilized in accordance with the present invention as long as the sheet of material 22 may be disposed upon the inner surface 20 of a basket 12 and remain attached thereto, as described herein. Typically the sheet of material 22 has a thickness in a range of less than about 0.2 mils to about 10 mils. In a preferred embodiment, the sheet of material 22 is constructed from one sheet of man-made organic polymer film having a thickness in a range of from less than about 0.5 mils to about 2.5 mils.

Figure 1:
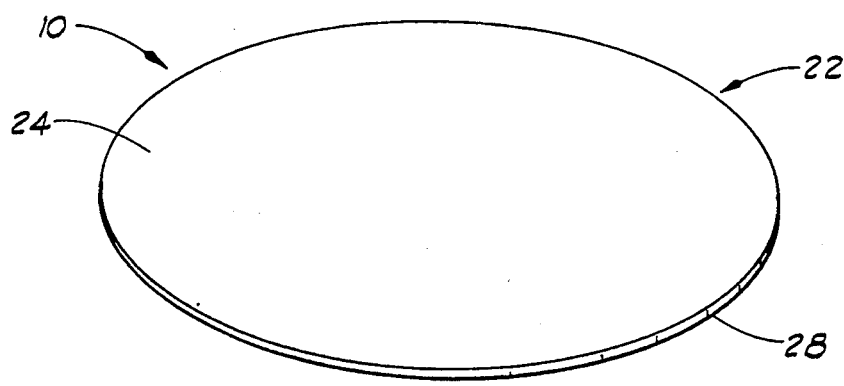
FIG. 1 is a perspective view of the basket lining material of the present invention showing the upper surface.
Figure 2:
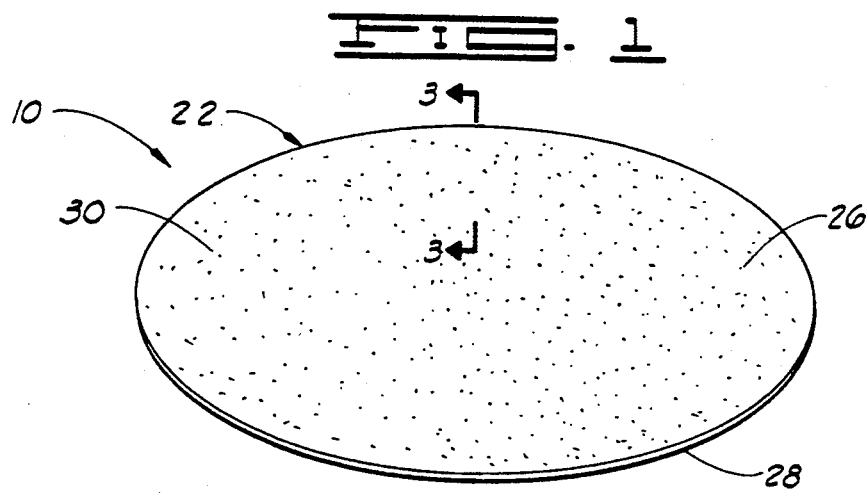
FIG. 2 is a perspective view of the basket lining material of FIG. 1, but showing the lower surface.

Referring to FIGS. 2–4, the adhesive 30 is disposed on the lower surface 26 of the sheet of material 22 by spraying or painting it thereupon. As shown in additional embodiments, i.e., FIGS. 20–24, the adhesive 30 may also be placed upon to the upper surface 24 of the sheet 22. The adhesive 30 used herein may be any one of those known in the art and commercially available.

The adhesive 30 imparts sufficient adhesion to permit the sheet of material 22 to be disposed in the basket opening 19 with the lower surface 26 of the sheet of material 22 disposed adjacent the inner surface 20 of the basket 12 so that the adhesive 30 on the sheet of material 22 adhesively contacts the inner surface 20 of the basket 12 for adhesively connecting the sheet of material 22 to the inner surface 20 of the basket 12. The adhesive 30 also permits the lower surface 26 of the sheet 22 to conform to the inner surface 20 of the basket 12. That is, the lower surface 26 of the sheet 22 adheres to the inner surface 20 of basket 12 and it adheres to like portions of itself, as shown in FIGS. 6-7. And, when the upper surface 24 of the sheet 22 also has adhesive thereupon, the upper surface 24 also adheres to like portions of itself. In this manner, a customized fit of the sheet 22 to the inner surface 20 of the basket 12 is obtained, even when the sheet 22 is shaped and sized differently than the basket 12. It will be appreciated that when the sheet 22 is placed inside a basket 12, the sheet of material 22 covers substantially the entire inner surface 20 of the basket 12.

Figure 13:
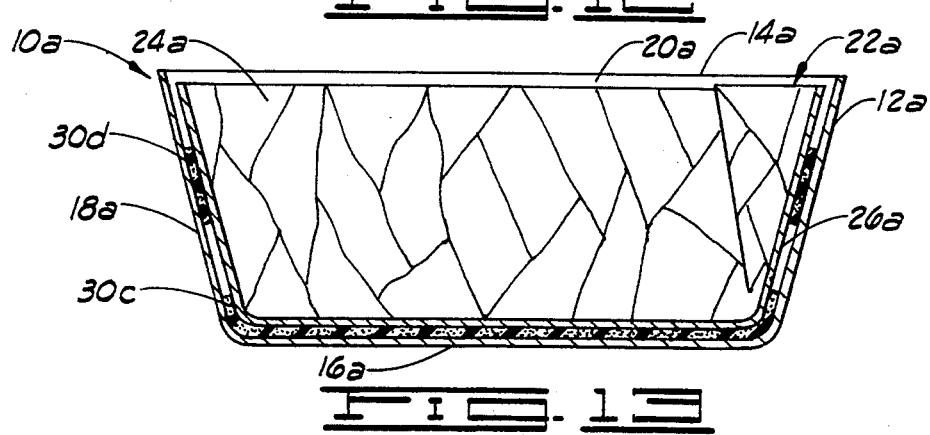
FIG. 13 is a cross-sectional partial view of FIG. 12 taken substantially along the lines 13—13 of FIG. 12.
Figure 15:
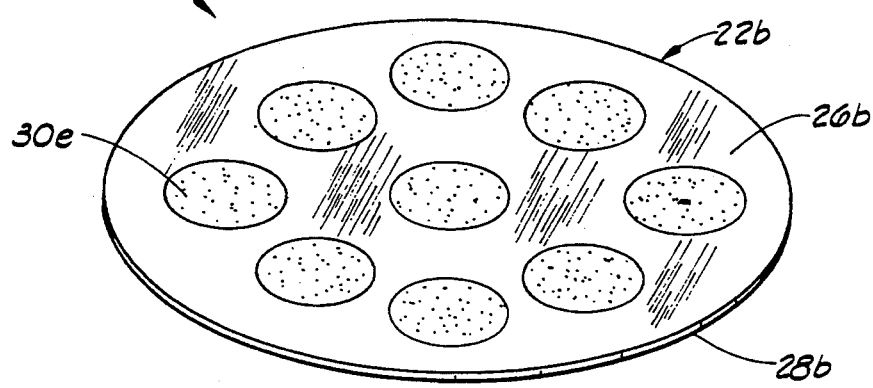
FIG. 15 is a perspective view of the basket lining material of FIG. 14, but showing the lower surface.
Figure 19:
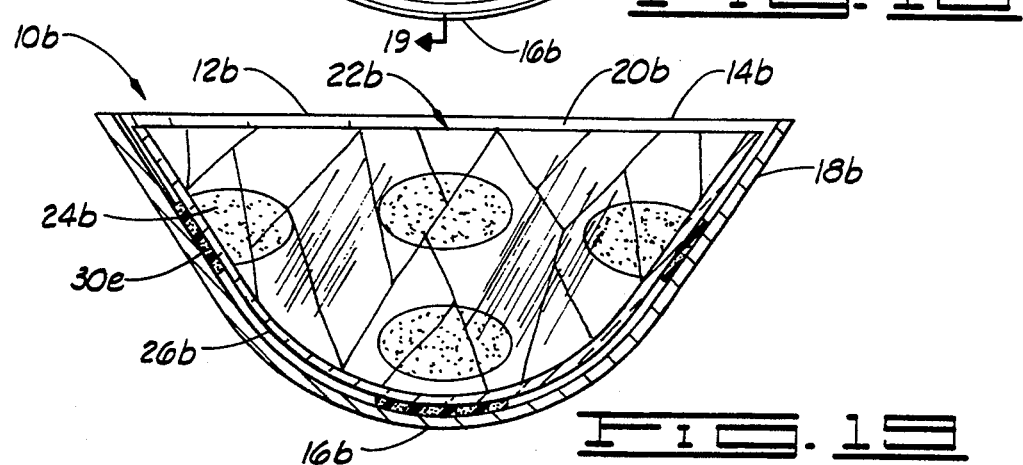
FIG. 19 is a cross-sectional partial view of FIG. 18 taken substantially along the lines 19—19 of FIG. 18.

The adhesive 30 may also comprise at least one strip of adhesive 30 extending over the lower surface 26 of the sheet of material 22, as shown in FIGS. 9 and 13. Alternatively, the adhesive 30 may comprise at least one spot of adhesive 30 extending over the lower surface 26 of the sheet of material 22, as shown in FIGS. 15 and 19. The adhesive 30 may comprise a variety of designs, both geometric and fanciful (for example, hearts, flowers, slogans, and the like). The adhesive 30 may also comprise a variety of colors. It will be appreciated that the adhesive 30, when disposed upon the lower surface 26 of the sheet 22, is substantially flat.

As illustrated in FIG. 4, the adhesive 30 on the lower surface 26 of the sheet of material 22 may be covered with at least one release strip 32. The release strip 32 is used to protect the adhesive 30 before the lower surface 26 of the sheet 22, and the adhesive 30 thereon, is disposed adjacent the inner surface 20 of the basket 12. The release strip 32 has an upper surface 34, a lower surface 36, and an outer periphery 38. The lower surface 36 of the release strip 32 is disposed adjacent the adhesive 30 on the lower surface 26 of the sheet 22. It will be appreciated that the release strip 32 is also substantially flat.

FIGS. 5–7 illustrate one method of use of the present invention. First, a sheet of material 22 and a basket 12, as described in detail above, are provided. The release strip 32 is removed from the lower surface 26 of the sheet 22. Then, the sheet 22 is placed through the basket opening 19 in the upper end 14 of the basket 12 with the lower surface 26 of the sheet of material 22 having the adhesive 30 thereon disposed adjacent the inner surface 20 of the basket 12, to adhesively contact the inner surface 20 of the basket 12. The sheet of material 22 is spread over the inner surface 20 of the basket 12 to permit the adhesive 30 on the lower surface 26 of the sheet of material 22 to adhesively contact like portions of the lower surface 26 of the sheet 22 for adhesively connecting one like portion of the lower surface 26 of the sheet 22 to at least one other like portion. The adhesive 30 on the lower surface 26 of the sheet 22 contacts the inner surface 20 of the basket 12, adhesively connecting the sheet of material 22 to the inner surface 20 of the basket 12. The connections of the sheet 22 to like portions thereof and to the inner surface 20 of the basket 12 produce a customized fit of the sheet of material 22 to the inner surface 20 of the basket 12.

Unless the sheet of material 22 is precisely sized to fit the inner surface 20 of the basket 12, overlapping folds 29 (only one such overlapping fold being designated with a reference numeral in FIGS. 5–7) are formed in the sheet of material 22. The overlapping folds 29 extend at different angles and over different lengths.

Embodiments of FIGS. 8–13

Shown in FIGS. 8 and 9 is a modified basket lining material 10a which is constructed exactly like the basket lining material 10 shown in FIGS. 1–4 and described in detail previously, except that the sheet of material 22a is rectangular instead of round, and the adhesive on the lower surface 26a of the sheet 22a is comprised of strips, each strip designated separately as 30a, 30b, 30c and 30d.

The outer periphery 28a of the sheet 22a is comprised of four sides, namely, a first side 40, a second side 42, a third side 44, and a fourth side 46. The strips of adhesive 30a–d are shown evenly spaced, uniform in size and in shape, and in parallel alignment between the third side 44 and the fourth side 46 of the sheet 22a. It will be appreciated, however, that the strips of adhesive 30a–d may vary in size, shape, and location upon the sheet of material 22a. That is, the strips 30a–d may be asymmetrical in shape, length or placement. For example, the strips 30a–d may be W-shaped, or have a continuous U-shape (not shown).

Figure 11:
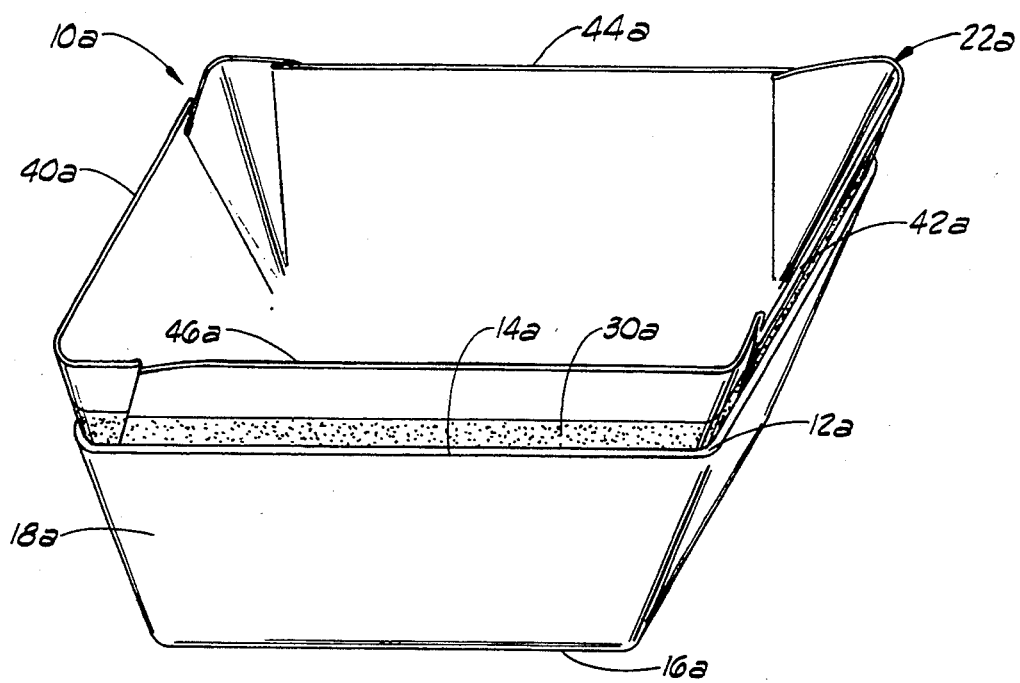
FIG. 11 is a perspective view of the basket lining material of FIGS. 8 and 9 partially disposed in a modified basket.
Figure 12:
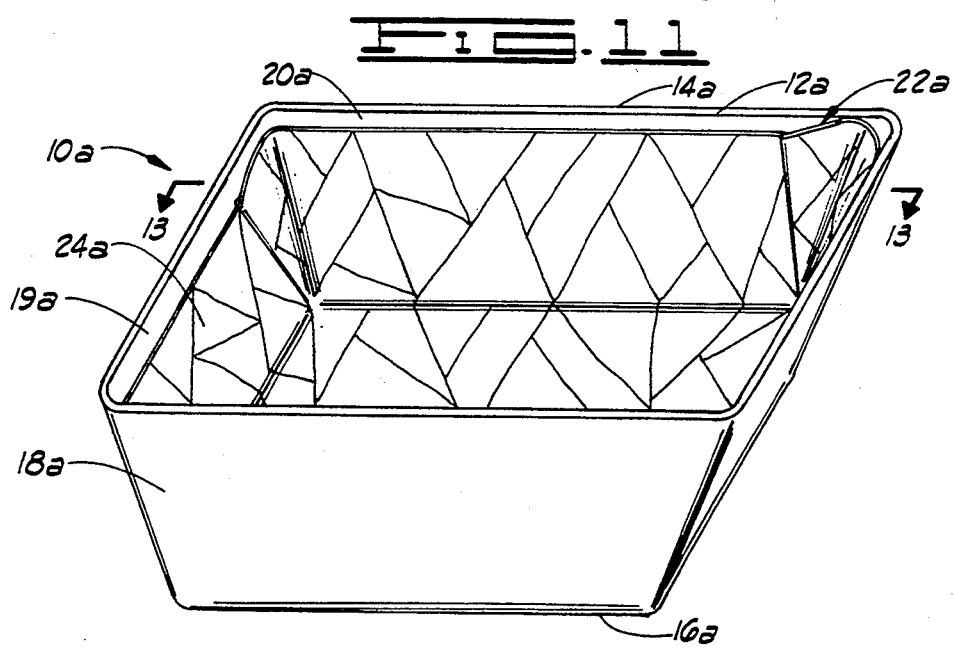
FIG. 12 is a perspective view of the basket lining material of FIG. 11 disposed in the basket.

FIGS. 10–13 illustrate one method of use of the present invention. The basket lining material 10a is contained as a roll 48 in a dispenser 50, as illustrated in FIG. 10. The plurality of sheets of material 22a in the roll 48 are connected by perforations (the sheet 22a shown partially detached and turned back for illustration purposes only). Alternatively, the roll 48 may simply be formed as a continuous roll 48 without perforations, and the basket lining material 10a may be severed into separate sheets 22a by a serrated cutting edge (not shown) contained within the dispenser 50, or by a separate cutting element (not shown). Any number of sheets of material 22a may form the roll 48 as long as it is possible to withdraw at least one sheet 22a from the roll 48 as described previously. Optionally, a release strip (not shown, but like the release strip 32 described before) may be used to cover the lower surface 26a of the sheet 22a. It will be appreciated that the release strip will detach from the roll 48 in the same manner and simultaneously, with the detachment of the sheet of material 22a. Referring to FIGS. 11–13, after being withdrawn and detached from the roll 48, the sheet 22 is placed in the basket 12a by exactly the same method shown in FIGS. 5-7 and previously described in detail.

Embodiments of FIGS. 14–19

Figure 14:
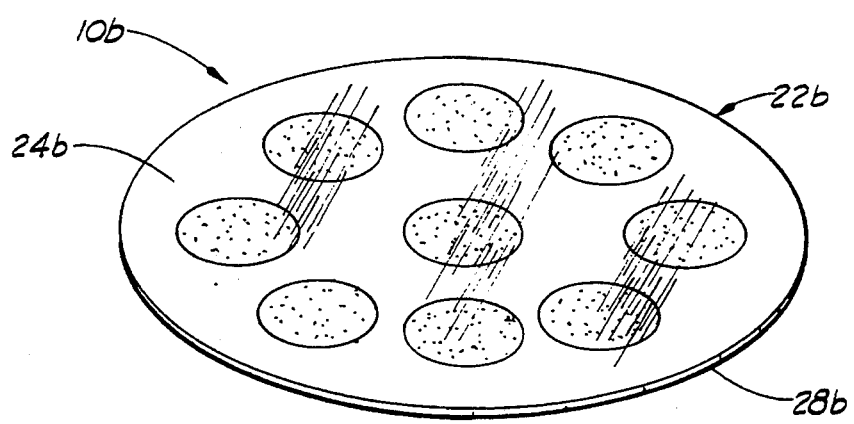
FIG. 14 is a perspective view of another modified basket lining material showing the upper surface.

Shown in FIGS. 14 and 15 is a modified basket lining material 10b which is constructed exactly like the basket lining material 10 shown in FIGS. 1-3 and 5-7 and described in detail previously, except that the sheet of material 22b is transparent, and the adhesive on the lower surface 26b of the sheet 22b is comprised of a plurality of multi-color spots 30e.

Onlt one of the spots 30e is designated by the reference numeral in FIGS. 14–19. The spots 30e are uniformly sized, shaped and spaced. It will be appreciated, however, that the plurality of adhesive spots 30e may vary in size, shape and placement.

Figure 16:
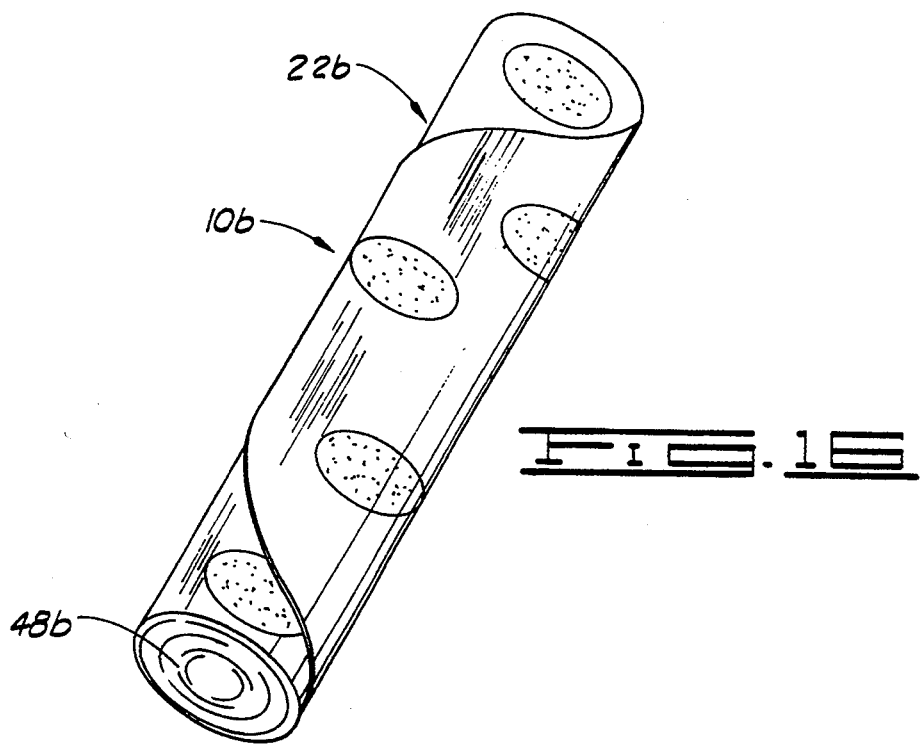
FIG. 16 is the basket lining material of FIGS. 14 and 15 formed in a continuous roll of material.
Figure 17:
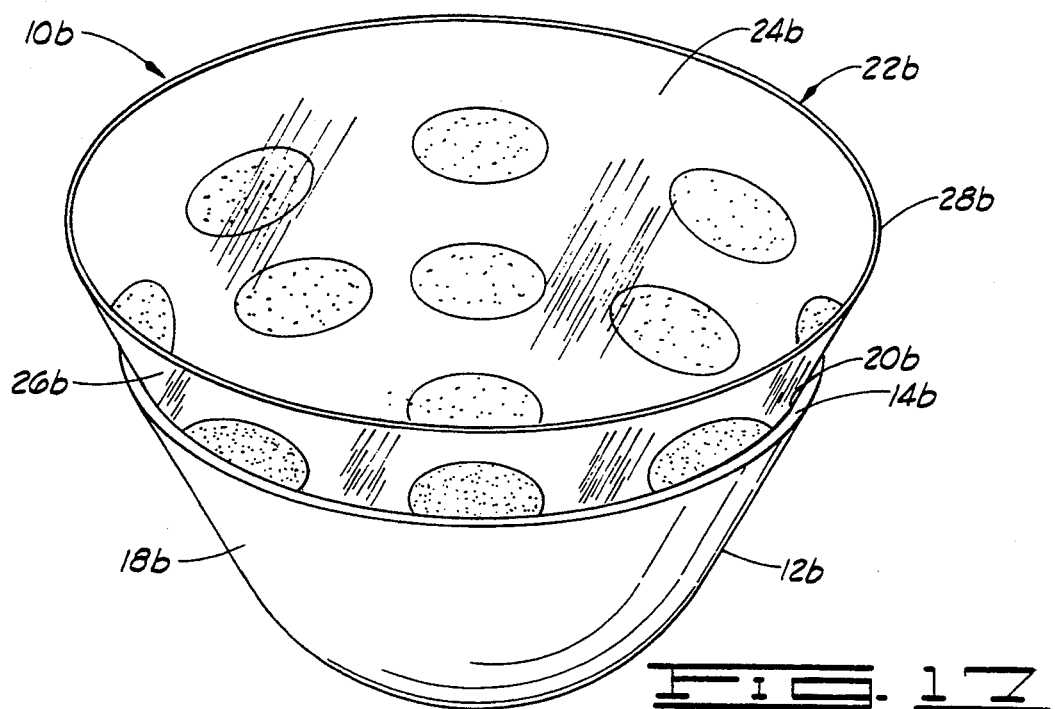
FIG. 17 is a perspective view showing the basket lining material of FIGS. 14 and 15 partially disposed in a basket.
Figure 18:
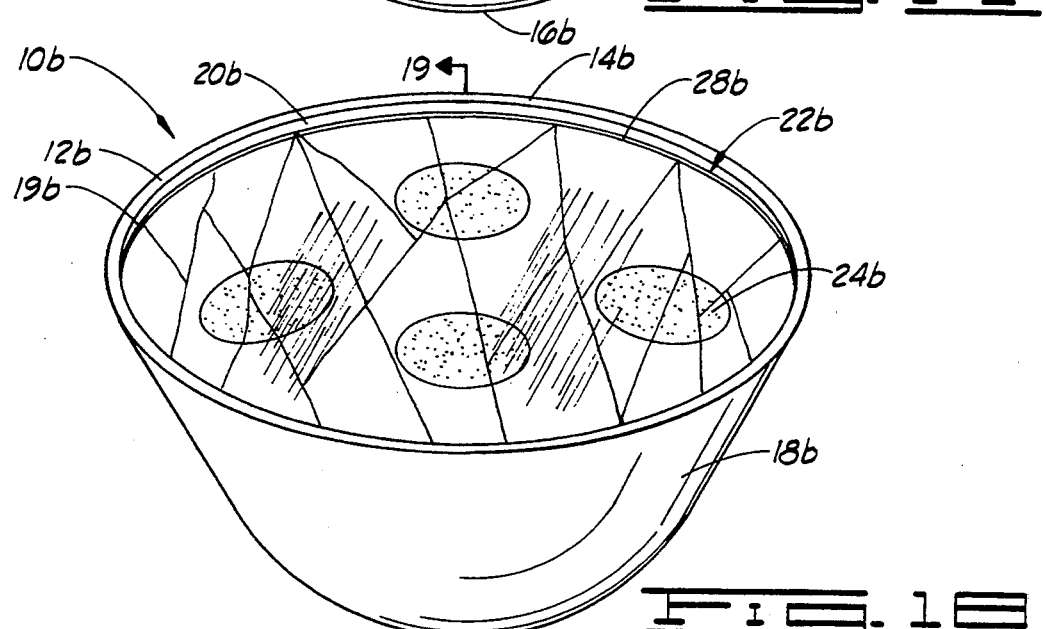
FIG. 18 is a perspective view similar to FIG. 17, but showing the basket lining material contained within the basket.

In another method of use, illustrated in FIG. 16, the transparent sheet 22b is rolled into a continuous roll 48b of basket lining material 10b without a dispenser. In this embodiment, only one sheet 22b is included in the roll 48b, although a plurality of sheets 22b could be included in the roll 48b. The rolled sheet 22b acts as its own release strip 32b, thereby protecting the adhesive spots 30e on the lower surface 26b of the sheet 22b. Referring to FIGS. 17–19, the sheet 22b is rolled out, and disposed upon the inner surface 20b of the basket 12b, by exactly the same method shown in FIGS. 5-7 and previously described in detail herein.

Embodiments of FIGS. 20–24

Shown in FIGS. 20–22 is a modified basket lining material 10c which is constructed exactly like the basket lining material 10 shown in FIGS. 1–4 and described in detail previously, except that the sheet of material 22c has an additional adhesive 30h disposed upon the upper surface 24c of the sheet 22c, and the sheet 22c with its release strip 32c is rolled into a roll 48c, as previously illustrated in FIG. 16 and described in detail.

The additional adhesive 30h is disposed on the upper surface 24c of the sheet 22c by any method described herein, to substantially cover the entire upper surface 24c of the sheet 22c. It will be appreciated, however, that the additional adhesive 30h may also comprise strips, spots, or combinations thereof. The adhesive 30c' is attached to the lower surface 26c of the sheet 22c.

In another method of use, illustrated in FIG. 23, the sheet 22c is rolled into a roll 48c with the upper surface 24c of the sheet 22c rolled inward to act as its own release strip 32c when unrolled, the release strip 32c comprising then the outer surface of the roll 48c (the release strip 32c is partially folded back for illustration purposes only).

Figure 24:
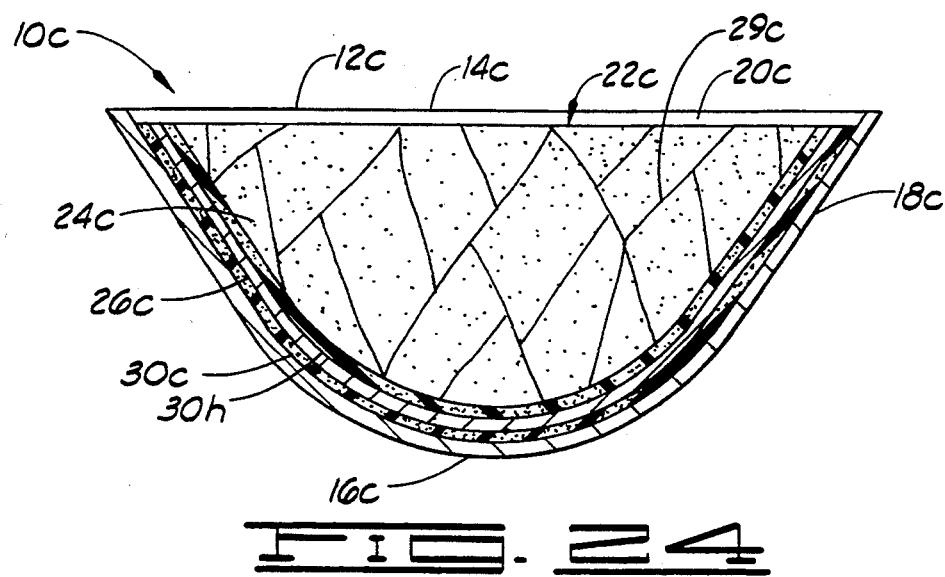
FIG. 24 is a cross-sectional view of the basket lining material of FIGS. 20 and 21 disposed in a basket.

The sheet of material 22c is then rolled out, and the release strip 32c is removed from the lower surface 26c of the sheet 22c (not shown). The sheet 22c is then disposed upon the inner surface 20c of the basket 12c by exactly the same method as previously shown in FIGS. 5-7 and described in detail above. As shown in FIG. 24, the adhesive 30h disposed upon the upper surface 24c of the sheet 22c will cause like portions of the upper surface 24c of the sheet 22c to adhere to other like portions, forming adhesively connected overlapping folds 29c (shown in FIG. 24), creating a customized fit of the sheet 22c to the basket 12c.

Embodiments of FIGS. 25–30

Figure 25:
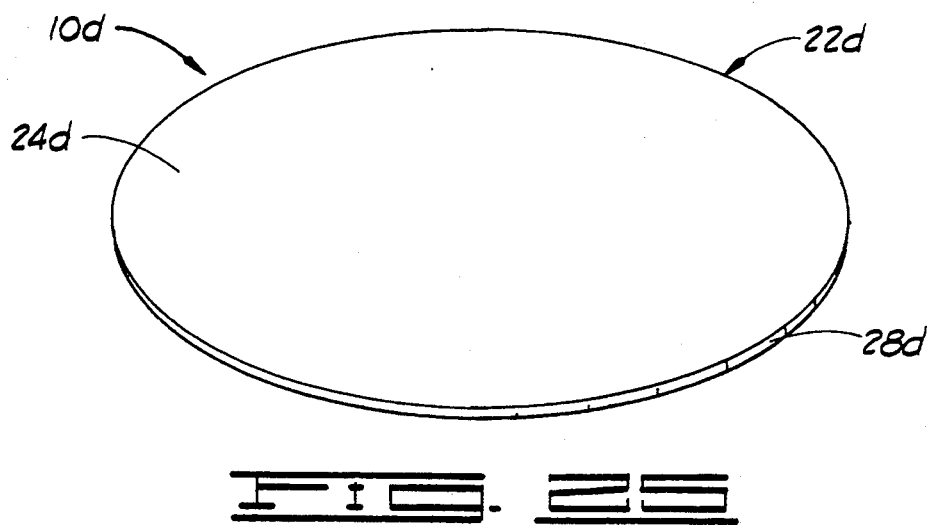
FIG. 25 is a perspective view of the basket lining material of FIG. 1, showing the upper surface.
Figure 26:
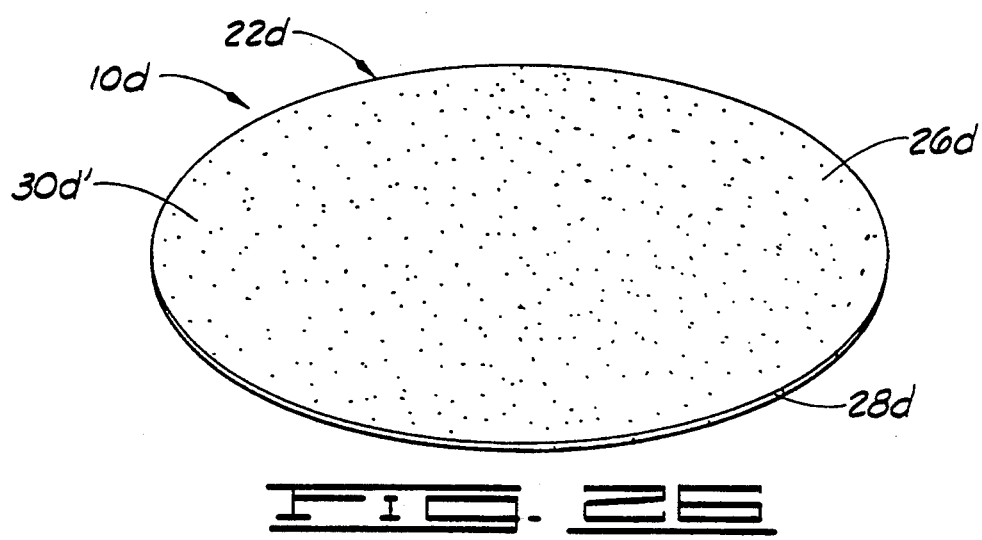
FIG. 26 is a perspective view of the basket lining material of FIG. 25, but showing the lower surface.
Figure 27:
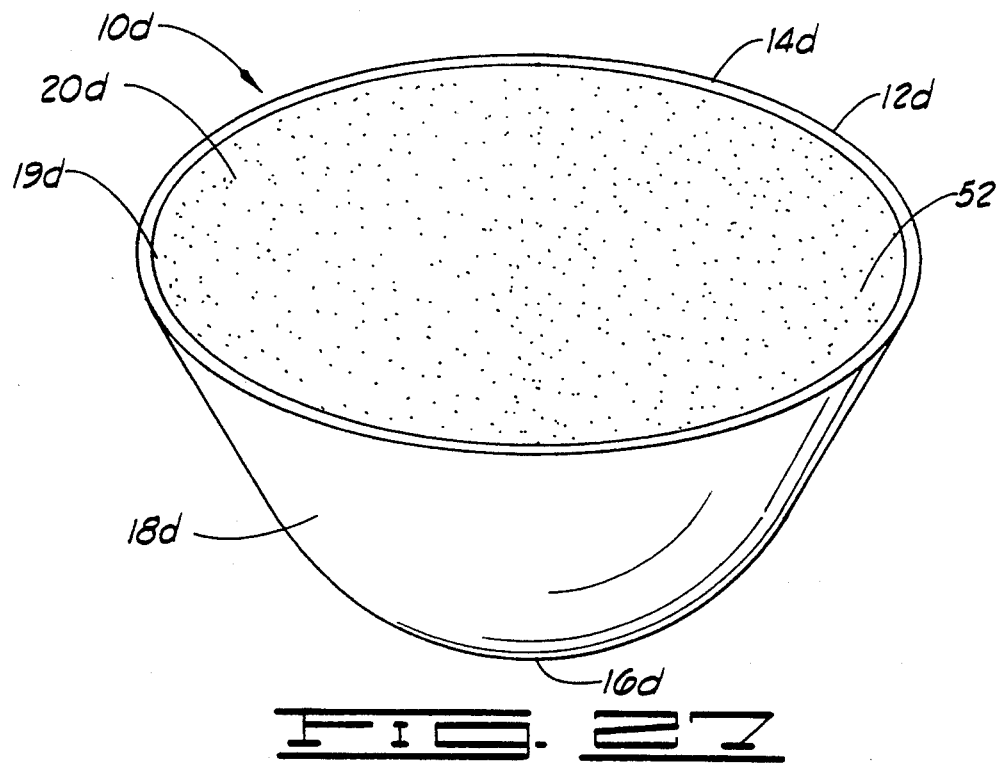
FIG. 27 is a perspective view of a modified basket, showing a cohesive disposed over the inner surface thereof.
Figure 28:
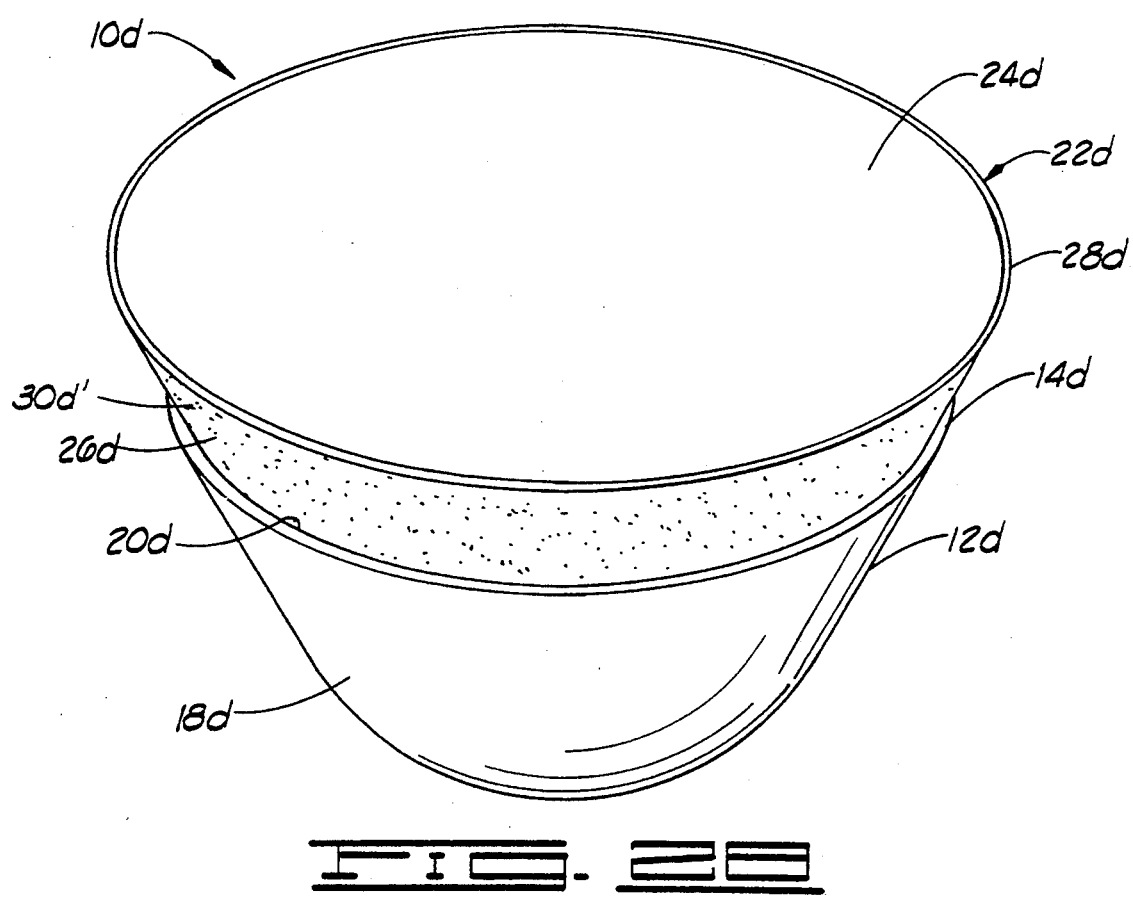
FIG. 28 is a perspective view showing the basket lining material of FIGS. 25 and 26 partially disposed in the basket of FIG. 27.
Figure 29:
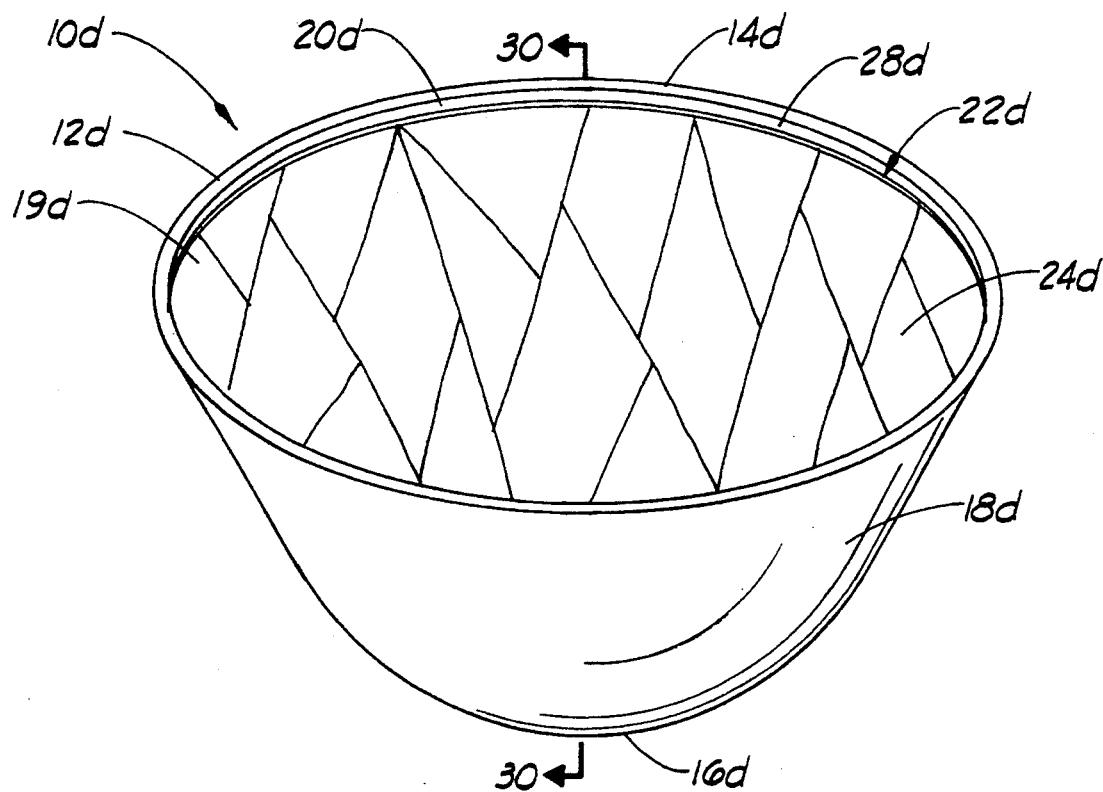
FIG. 29 is a perspective view similar to FIG. 28, but showing the basket lining material contained within the basket.

Shown in FIGS. 25 and 26 is a basket lining material 10d which is constructed exactly like the basket lining material 10 shown in FIGS. 1–4 and described in detail previously, except that a cohesive 30d' is disposed on the lower surface 26d of the sheet 22d, and a cohesive 52 is disposed on the inner surface of the basket 12d.

Figure 30:
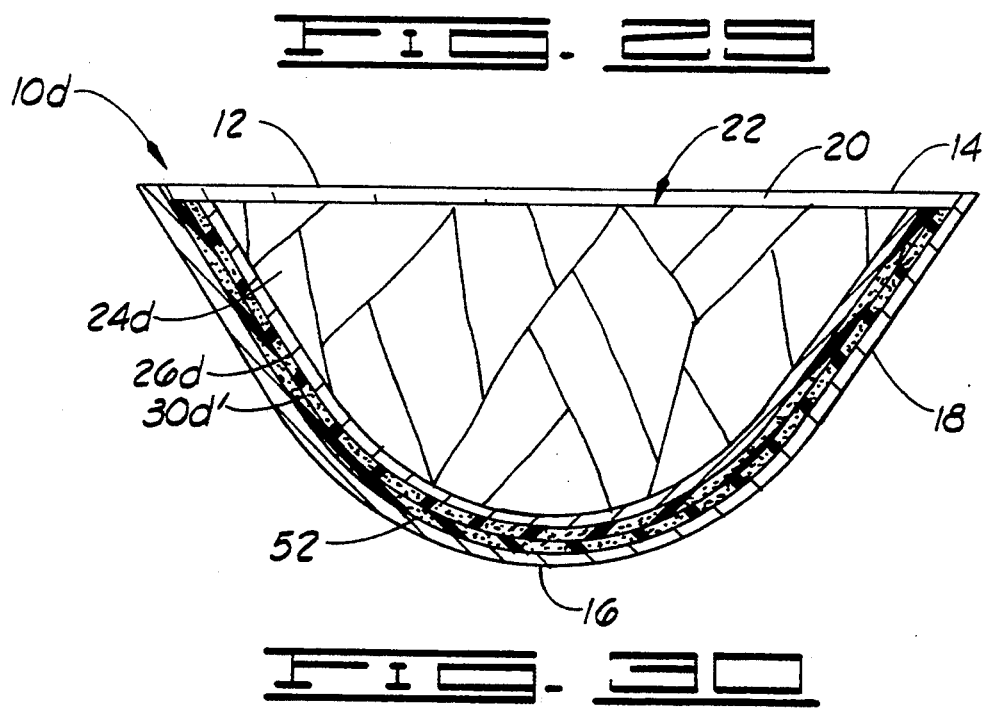
FIG. 30 is a cross-sectional view of FIG. 29 taken substantially along the lines 30—30 of FIG. 29.

The cohesives 30d' and 52 are disposed upon the lower surface 26d of the sheet of material 22d, and disposed upon the inner surface 20d of the basket 12d, respectively, by any method previously described herein for disposing the adhesive 30 upon the sheet of material 22. Further, the cohesives 30d' and 52, respectively, cover substantially both the entire lower surface of the sheet of material 22d, and the entire inner surface 20d of the basket 12d, as illustrated in FIG. 30. It will be appreciated that the cohesive 52 may comprise a solid section, strips, spots, or any combination thereof. The cohesive 30d' and 52 used herein may be any one of those known in the art and commercially available.

In another method of use, illustrated in FIGS. 27–30, the sheet of material 22d is disposed on the inner surface 20d of the basket 12d by the same method previously shown in FIGS. 5-7 and described in detail herein. The cohesive 30d' on the lower surface 26d of the sheet of material 22d cohesively contacts like portions of the lower surface 26d of the sheet 22d, cohesively connecting one like portion of the lower surface 26d of the sheet 22d to at least one other like portion. The cohesive 30d' on the lower surface 26d of the sheet 22d also contacts the cohesive 52 on the inner surface 20d of the basket 12d, cohesively connecting the sheet of material 22d to the inner surface 20d of the basket 12d. The cohesive connections of the sheet 22d to like portions thereof and to the inner surface 26d of the basket 12d produce overlapping folds and a customized fit of the sheet of material 22d to the inner surface 20d of the basket 12d.

In a further embodiment (not shown), in lieu of the cohesive 52 on the inner surface 20 of the basket 12, an adhesive could be substituted. Then, the sheet of material 22 would not include an adhesive or cohesive. The sheet of material 22, when placed in the basket 12, against the inner surface 20 of the basket 12, would then contact the adhesive on the inner surface 20 of the basket 12 and the adhesive would adhesively connect the sheet of material 22 to the inner surface 20 of the basket 12. The method of placing the sheet of material 22 into the basket 12 is consistent with those methods described previously herein.

Changes may be made in the embodiments of the invention described herein or in parts or elements of the embodiments described herein or in the steps or in the sequence of steps of the methods described herein without departing from the spirit and scope of the invention as defined in the following claims.

What is claimed is:

1. A basket lining material, comprising:

a basket having an upper end, a lower end, and an outer surface, a basket opening being formed in the basket with a portion of the basket opening intersecting the upper end of the basket forming an inner surface having contours, the basket opening being sized and shaped for receiving items and the items being retained in the basket opening by the basket; and an unpreformed sheet of material having an upper surface, a lower surface and an outer periphery, the sheet of material having an adhesive on at least one surface thereof, the sheet of material being disposed in the basket opening without first being preformed to conform to the inner surface of the basket the adhesive on the sheet of material being disposed adjacent the inner surface of the basket and the sheet of material being crushed and flattened against the inner surface of the basket thereby forming a liner, the liner adhesively contacting and connecting to the inner surface of the basket, the liner thereby substantially conforming to the shape of the inner surface of the basket, the adhesive bonding to the inner surface of the basket and holding the liner in place against the inner surface of the basket, wherein items placed in the basket are received upon the liner, and wherein the liner remains firmly and unmovingly connected to the inner surface of the basket when items are both disposed and retained on the liner.

2. The basket lining material of claim 1 wherein the material is selected from the group consisting of man-made organic polymer films, fabric (woven or nonwoven or synthetic or natural), paper, burlap, cellulose, foil, or combinations thereof.

3. The basket lining material of claim 1 wherein the sheet of material comprises a thickness in a range of less than about 0.2 mils to about 10 mils.

4. The basket lining material of claim 1 wherein the sheet of material comprises a thickness in a range of less than about 0.5 mils to about 2.5 mils.

5. A method for lining a basket with a basket lining material and placing items in the lined basket, comprising:

providing a basket having an upper end, a lower end, and an outer surface, a basket opening being formed in the basket with a portion of the basket opening intersecting the upper end of the basket forming an inner surface having contours, the basket opening being sized and shaped for receiving items and the items being retained in the basket opening by the basket;

providing an unpreformed sheet of material having an upper surface, a lower surface and an outer periphery, the sheet of material having an adhesive on at least one surface thereof;

disposing the sheet of material in the basket opening without first preforminq the sheet of material to conform to the inner surface of the basket, the adhesive on the sheet of material being disposed adjacent the inner surface of the basket;

crushing and flattening the sheet of material against the inner surface of the basket thereby forming a liner, the liner adhesively contacting and connecting to the inner surface of the basket, the liner thereby substantially conforming to the shape of the inner surface of the basket, the adhesive bonding to the inner surface of the basket and holding the liner in place aqainst the inner surface of the basket;

providing items to be disposed into the lined basket; and disposing the items in the lined basket, wherein items placed in the basket are received upon the liner, and wherein the liner remains firmly and unmovingly connected to the inner surface of, the basket when items are both disposed and retained on the liner.

6. The method of claim 5 wherein the material is selected from the group consisting of man-made organic polymer films, fabric (woven or nonwoven or snthetic or natural), paper, burlap, cellulose, foil, or combinations thereof.

7. The method of claim 5 wherein the sheet of material comprises a thickness in a range of less than about 0.2 mils to about 10 mils.

8. The method of claim 5 wherein the sheet of material comprises a thickness in a range of less than about 0.5 mils to about 2.5 mils.

* * * * *

UNITED STATES PATENT AND TRADEMARK OFFICE
CERTIFICATE OF CORRECTION

PATENT NO. : 5,411,167
DATED : May 2, 1995
INVENTOR(S) : Donald E. Weder

It is certified that error appears in the above-indentified patent and that said Letters Patent is hereby corrected as shown below:

Column 1, line 39, please delete "ling", and substitute therefore --lining--.

Column 6, line 22, please delete "removedfrom", and substitute therefor --removed from--.

Column 8, line 48, please delete "snthetic", and substitute therefor --synthetic--.

Signed and Sealed this

Eleventh Day of June, 1996

Attest:

BRUCE LEHMAN

*Attesting Officer*  *Commissioner of Patents and Trademarks*